United States Patent
Salter et al.

(10) Patent No.: US 12,189,736 B1
(45) Date of Patent: Jan. 7, 2025

(54) METHOD AND DEVICE FOR AUTOMATIC AUTHENTICATION

(71) Applicant: Apple Inc., Cupertino, CA (US)

(72) Inventors: Thomas G. Salter, Foster City, CA (US); Rahul Nair, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 422 days.

(21) Appl. No.: 17/379,656

(22) Filed: Jul. 19, 2021

Related U.S. Application Data

(60) Provisional application No. 63/058,923, filed on Jul. 30, 2020.

(51) Int. Cl.
*G06F 21/00* (2013.01)
*G06F 21/32* (2013.01)
*G06T 7/20* (2017.01)
*G06V 40/18* (2022.01)

(52) U.S. Cl.
CPC ................ *G06F 21/32* (2013.01); *G06T 7/20* (2013.01); *G06V 40/18* (2022.01)

(58) Field of Classification Search
CPC ...... G06V 20/80; G06V 40/19; G06V 40/197; G06V 40/20; G06F 3/013; G06F 3/017; G06F 21/32; G06F 21/36
See application file for complete search history.

(56) References Cited

U.S. PATENT DOCUMENTS

| | | | |
|---|---|---|---|
| 9,516,018 B1 * | 12/2016 | Vazquez | G06F 21/34 |
| 10,063,560 B2 | 8/2018 | Gordon et al. | |
| 10,186,086 B2 * | 1/2019 | Giraldi | G06F 3/013 |
| 10,341,113 B2 | 7/2019 | Starner et al. | |
| 10,802,582 B1 * | 10/2020 | Clements | G06F 3/013 |
| 2018/0103284 A1 * | 4/2018 | Kubo | G06F 21/316 |
| 2019/0098005 A1 | 3/2019 | Joshi | |
| 2019/0132732 A1 * | 5/2019 | Bharti | H04W 12/06 |
| 2021/0073362 A1 * | 3/2021 | Alameh | G06F 3/013 |
| 2023/0168786 A1 * | 6/2023 | Mantri | G06F 16/9537 715/740 |

\* cited by examiner

*Primary Examiner* — William A Corum, Jr.
(74) *Attorney, Agent, or Firm* — Fernando & Partners, LLP

(57) ABSTRACT

In one implementation, a method of authenticating a user is performed by a first device including a camera, an eye tracker, one or more processors, and non-transitory memory. The method includes obtaining, via the camera, an image of a physical environment. The method includes detecting, in the image of the physical environment, a second device. The method includes determining, using the eye tracker, a gaze of a user. The method includes determining that the gaze of the user is directed to the second device. The method includes, in response to determining that the gaze of the user is directed to the second device, transmitting authentication credentials to the second device.

20 Claims, 10 Drawing Sheets

500

At a first device including a camera, an eye tracker, one or more processors, and non-transitory memory: — 510

Obtaining, via the camera, an image of a physical environment

↓

Detecting, in the image of the physical environment, a second device — 520

↓

Determining, using the eye tracker, a gaze of the user — 530

↓

Determining that the gaze of the user is directed to the second device — 540

↓

In response to determining that the gaze of the user is directed to the second device, transmitting authentication credentials to the second device — 550

Figure 5

METHOD AND DEVICE FOR AUTOMATIC AUTHENTICATION

CROSS-REFERENCE TO RELATED APPLICATIONS

This application claims priority to U.S. Provisional Patent App. No. 63/058,923, filed on Jul. 30, 2020, which is hereby incorporated by reference herein in its entirety.

TECHNICAL FIELD

The present disclosure generally relates to systems, methods, and devices for automatically authenticating a user.

BACKGROUND

A user with multiple electronic devices or multiple user accounts may be required to sign-in or otherwise be authenticated with each different device or user account before being provided access. This may be a time-consuming process. Further, a user may not easily remember the various authentication credentials used in various user accounts if such passwords are secure or a user may use weak passwords to ensure remembrance.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of authenticating a user in accordance with some implementations.

Figure 1:
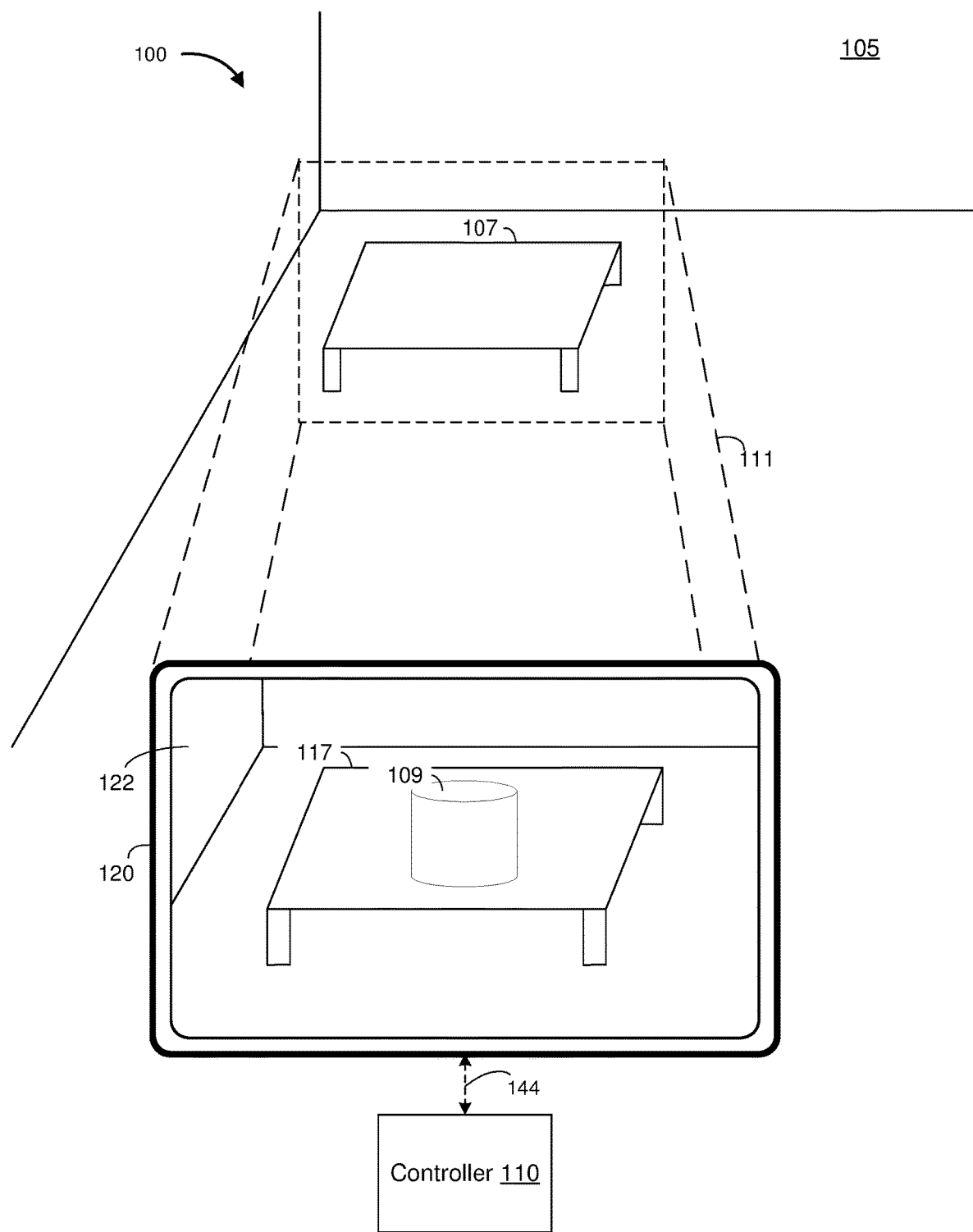
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for authenticating a user. In various implementations, the method is performed by a first device including a camera, an eye tracker, one or more processors, and non-transitory memory. The method includes obtaining, via the camera, an image of a physical environment. The method includes detecting, in the image of the physical environment, a second device. The method includes determining, using the eye tracker, a gaze of a user. The method includes determining that the gaze of the user is directed to the second device. The method includes, in response to determining that the gaze of the user is directed to the second device, transmitting authentication credentials to the second device.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A user manually providing authentication credentials to an electronic device can be a time-consuming process. Accordingly, in various implementations, another device that has authenticated the user automatically provides the authentication credentials to the electronic device. In various implementations, the other device includes an eye tracker and the authentication credentials are transmitted to the electronic device in response to the user looking at the electronic device.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display a virtual object (e.g., a virtual cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
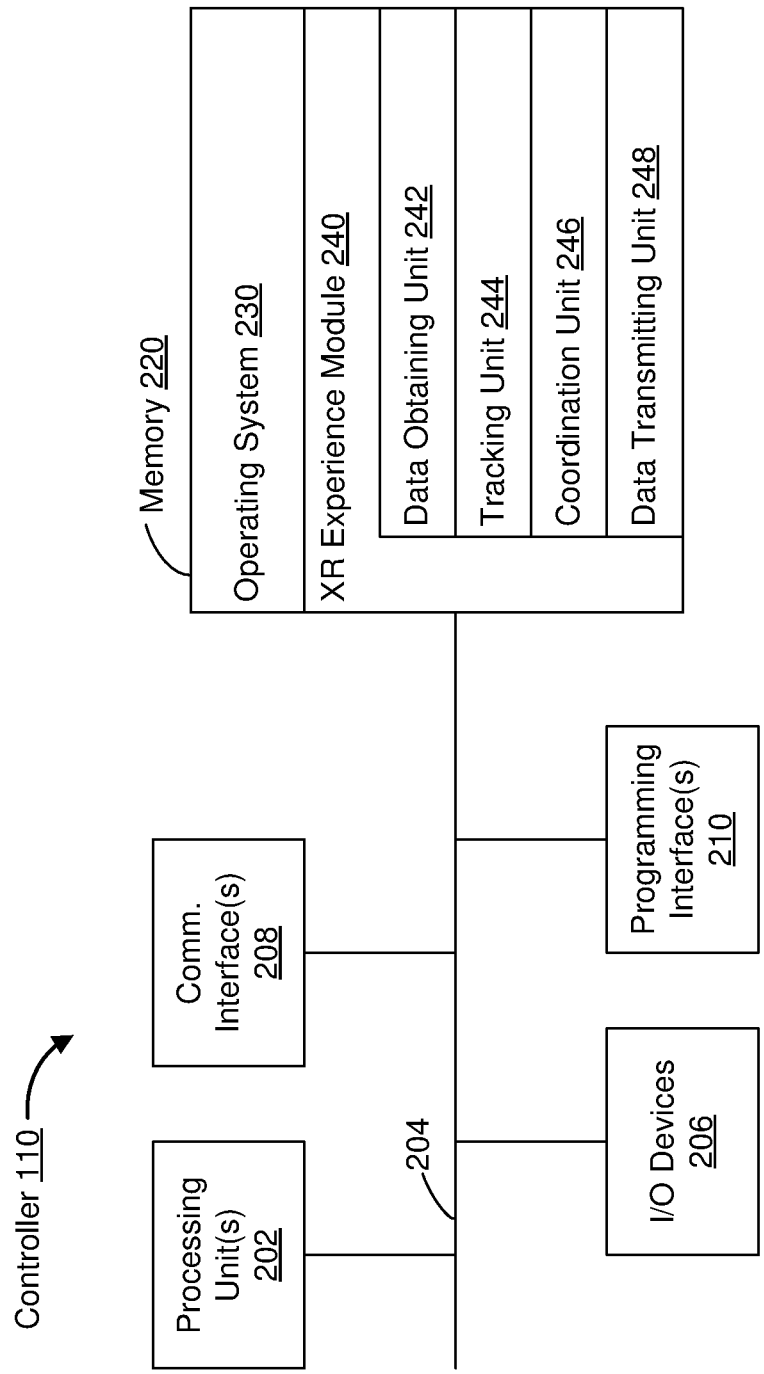
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
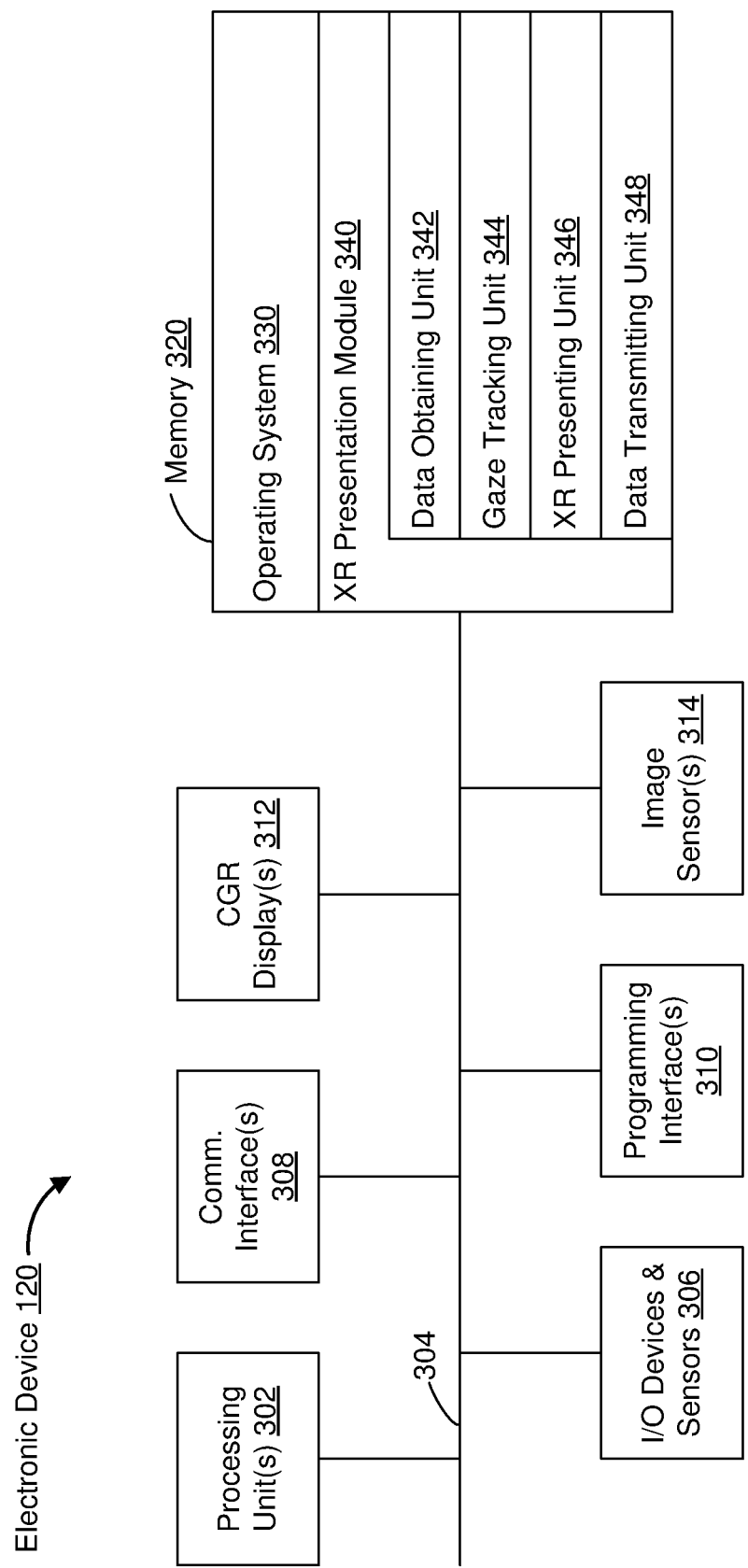
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a gaze tracking unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1B. To that end, in various implementations, the data obtaining unit 342 includes instructions and/or logic therefor, and heuristics and metadata therefor.

In some implementations, the gaze tracking unit 344 is configured to detect, in an image of a physical environment from the one or more image sensors 314, an electronic device. In various implementations, the gaze tracking unit 344 is configured to determine, in an image of at least one eye of a user from the one or more image sensors 314, a gaze of the user. In some implementations, the gaze tracking unit 344 is configured to determine that the gaze of the user is directed to the electronic device. To that end, in various implementations, the gaze tracking unit 344 includes instructions and/or logic therefor, and heuristics and metadata therefor.

In some implementations, the XR presenting unit 346 is configured to present XR content via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the gaze tracking unit 344, the XR presenting unit 346, and the data transmitting unit 348 are shown as residing on a single device (e.g., the electronic device 120), it should be understood that in other implementations, any combination of the data obtaining unit 342, the gaze tracking unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
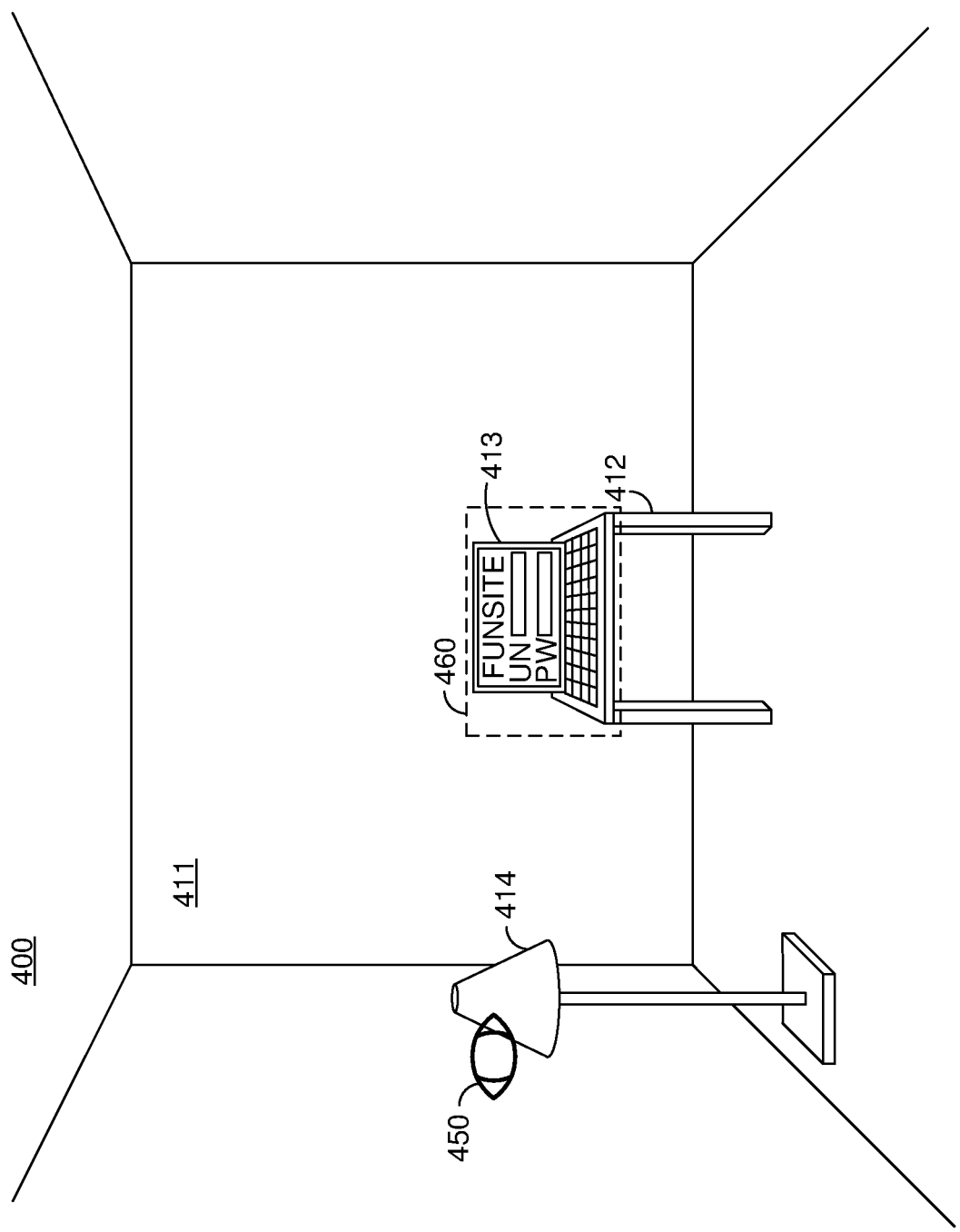
FIGS. 4A-4F illustrate an XR environment at a plurality of times in accordance with some implementations.

FIG. 4A illustrates an XR environment 400 based on a physical environment surveyed by a scene camera of a device. In various implementations, the scene camera is part of a device that is worn by the user and includes a display that displays the XR environment 400. Thus, in various implementations, the user is physically present in the physical environment. In various implementations, the scene camera is part of remote device (such as a drone or robotic avatar) that transmits images from the scene camera to a local device that is worn by the user and includes a display that displays the XR environment 400.

FIG. 4A illustrates the XR environment 400 at a first time. The XR environment 400 includes a plurality of objects, including one or more real objects (e.g., a wall 411, a table 412, a laptop 413, and a lamp 414) and one or more virtual objects (a gaze direction indicator 450). In various implementations, each object is displayed at a location in the XR environment 400, e.g., at a location defined by three coordinates in a three-dimensional (3D) XR coordinate system. Accordingly, when the user moves in the XR environment 400 (e.g., changes either position and/or orientation), the objects are moved on the display of the device, but retain their location in the XR environment 400. In various implementations, certain virtual objects (such as the gaze direction indicator 450) are displayed at locations on the display such that when the user moves in the XR environment 400, the objects are stationary on the display on the device.

The gaze direction indicator 450 indicates a gaze direction of the user, e.g., where in the XR environment 400 the user is looking. Although the gaze direction indicator 450 is displayed in FIGS. 4A-4F, in various implementations, the gaze direction indicator 450 is not displayed.

In FIG. 4A, the gaze direction indicator 450 is displayed over a portion the lamp 414 indicating that the user is looking at the lamp 414 at the first time.

In FIG. 4A, the laptop 413 displays a login screen for a website which provides fields for receiving a username and password for a user account associated with the website. In response to detecting the laptop 413, the XR environment 400 includes a device indicator 460 surrounding the laptop 413. In various implementations, the device indicator 460 is displayed in response to detecting an electronic device configured to accept authentication credentials (e.g., a login screen or a lock screen).

Figure 4B:
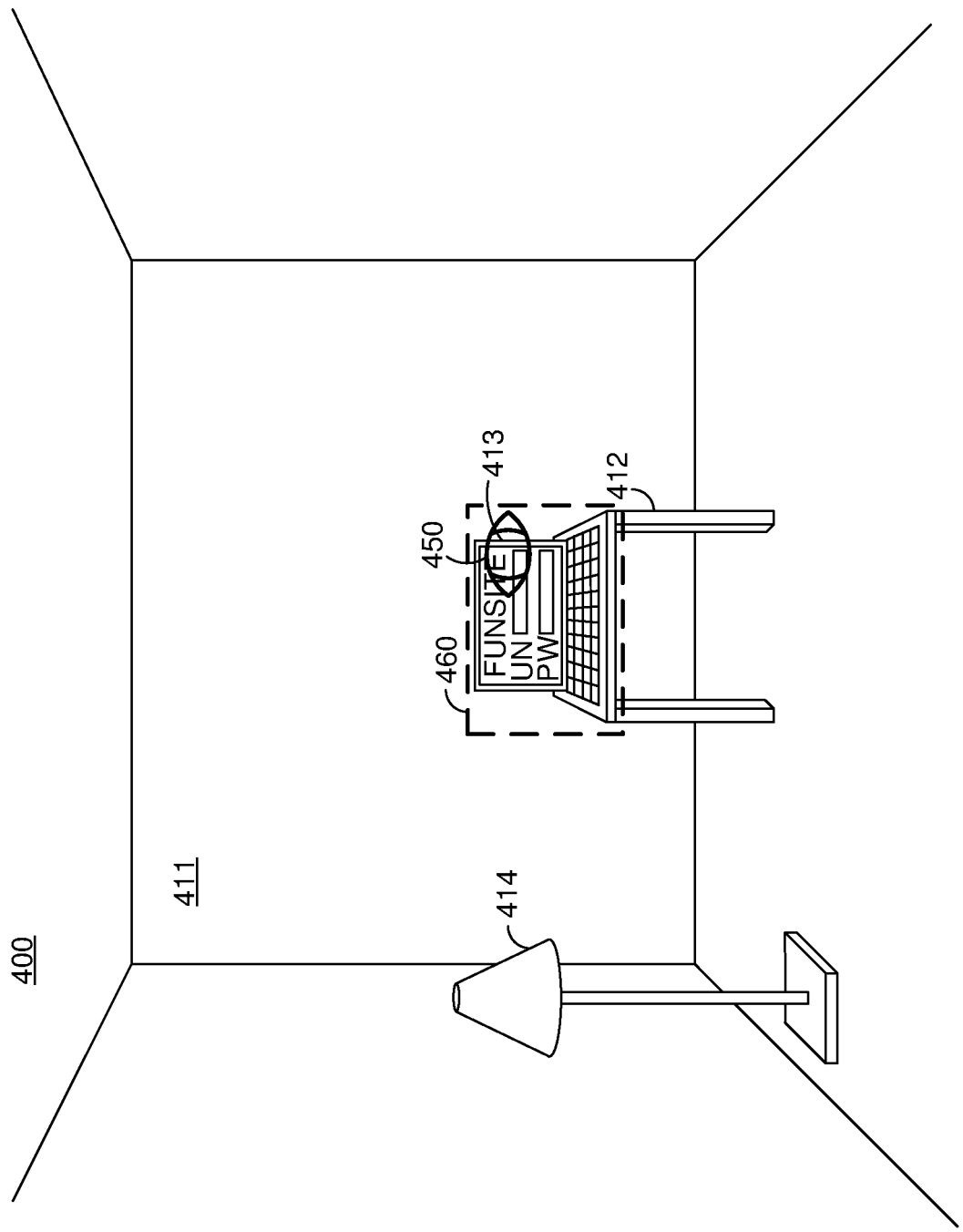

FIG. 4B illustrates the XR environment 400 of FIG. 4A at a second time. In FIG. 4B, the gaze direction indicator 450 is displayed over a portion of the laptop 413 indicating that the user is looking at the laptop 413 at the second time. In response to detecting that the user is looking at the laptop 413, the device transmits authentication credentials to the laptop 413. In particular, in FIG. 4B, in response to detecting that the user is looking at the laptop 413, the device transmits the username and password for a user account associated with the website. In some implementations, the device may only transmit credentials to the laptop 413 in response to detecting that the user is looking at a field for receiving a username or password on a display of the laptop 413. In other implementations, the device may transmit credentials to the laptop 413 in response to detecting that the user is looking at the laptop 413 and that the laptop 413 is in a state in which it requires credentials to proceed to a next state (e.g., website login, computer lock screen, and the like). In some implementations, the device may determine the appropriate credentials to send to the laptop 413 based on computer vision techniques to determine the service or function requesting the credentials. For example, the device may determine the website and associated account based on text or images in the displayed website, may determine that a particular laptop 413 is locked and requires a password to unlock, etc. In response to determining the service or function requesting credentials, the device may determine the appropriate username and password to transmit to the laptop 413. In other implementations, the device may transmit a request to the identified laptop 413 for an identity of the service or function requesting the credentials. For example, the device may determine that the user is looking at the laptop 413 and transmit a request to the laptop 413 to provide a URL or other identifier of the displayed website. In response to receiving the URL or other identifier, the device may determine the appropriate username and password to transmit to the laptop 413. Further, in response to detecting that the user is looking at the laptop 413, the device indicator 460 is displayed in a different manner (in FIG. 4B, different line width) to indicate that authentication credentials are being transmitted to the laptop 413.

In some implementations, the device may further transmit instructions to the laptop 413 to submit the credentials to the requesting service or function. In other implementations, the user may manually submit the credentials using an input associated with the laptop 413 (e.g., using a physical keyboard of the laptop 413).

Figure 4C:
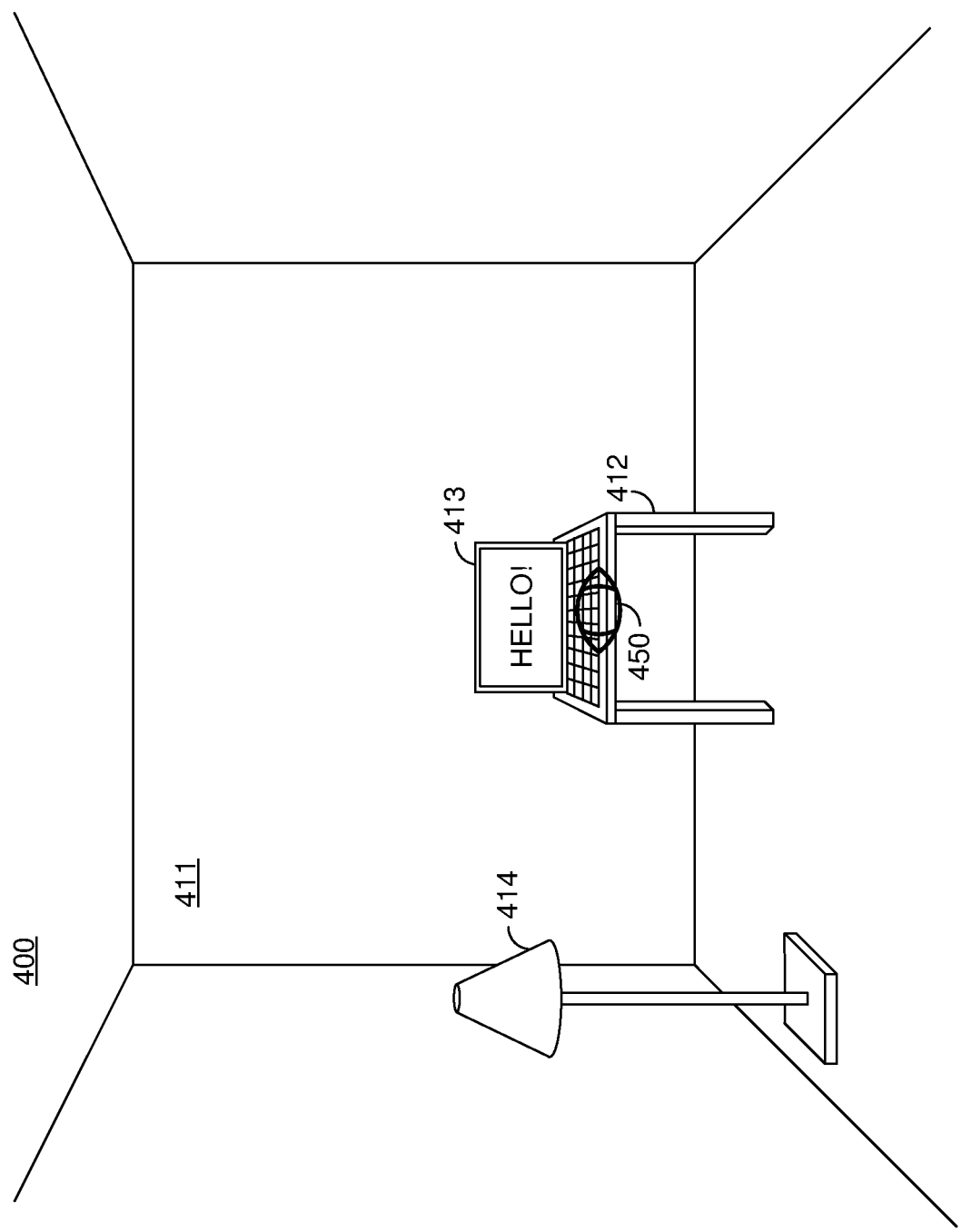

FIG. 4C illustrates the XR environment 400 of FIG. 4A at a third time. In FIG. 4C, the gaze direction indicator 450 is displayed over a portion of the laptop 413 indicating that the user remains looking at the laptop 413 at the third time. Further, in response to receiving the authentication credentials from the device, the laptop 413 displays a welcome screen of the website.

Figure 4D:
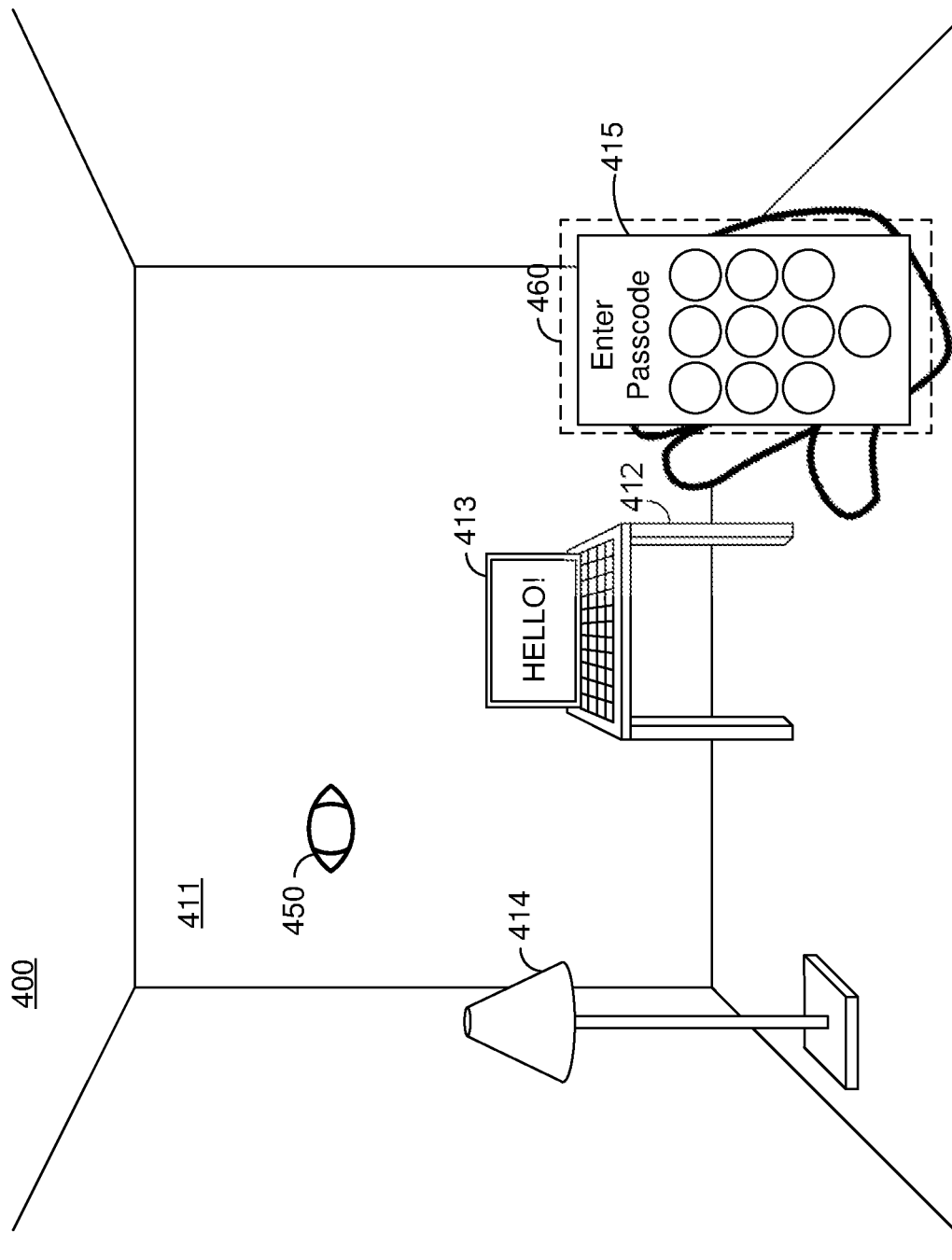

FIG. 4D illustrates the XR environment 400 of FIG. 4A at a fourth time. In FIG. 4D, the gaze direction indicator 450 is displayed over a portion of the wall 411 indicating that the user is looking at the wall 411 at the fourth time. At the fourth time, the user has removed a smartphone 415 from a pocket and is holding it in the user's hand (but not yet looking at it).

In FIG. 4D, the smartphone 415 displays a lock screen requiring input of a passcode to unlock the smartphone 415. In response to detecting the smartphone 415, the XR environment 400 includes the device indicator 460 displayed around the smartphone 415.

Figure 4E:
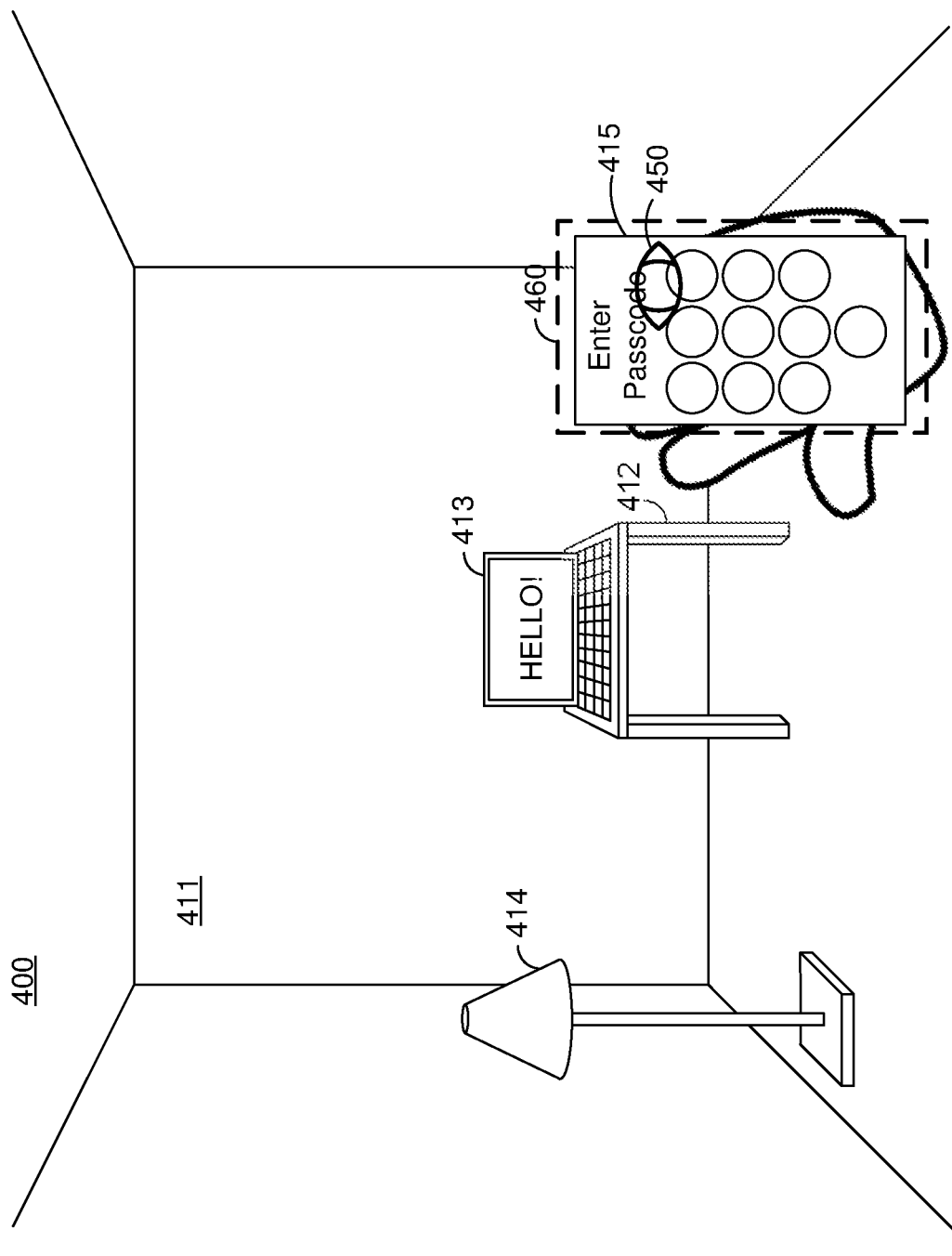

FIG. 4E illustrates the XR environment 400 of FIG. 4A at a fifth time. In FIG. 4E, the gaze direction indicator 450 is displayed over a portion of the smartphone 415 indicating that the user is looking at the smartphone 415 at the fifth time. In response to detecting that the user is looking at the smartphone 415, the device transmits authentication credentials to the smartphone 415. In particular, in FIG. 4E, in response to detecting that the user is looking at the smartphone 415, the device transmits the passcode (or other data) to unlock the smartphone 415. In some implementations, the device may only transmit credentials to the smartphone 415 in response to detecting that the user is looking at a field for receiving a username or password on a display of smartphone 415. In other implementations, the device may transmit credentials to the smartphone 415 in response to detecting that the user is looking at the smartphone 415 and that the smartphone 415 is in a state in which it requires credentials to proceed to a next state (e.g., website login, computer lock screen, and the like). In some implementations, the device may determine the appropriate credentials to send to the smartphone 415 based on computer vision techniques to determine the service or function requesting the credentials. For example, the device may determine the website and associated account based on text or images in the displayed website, may determine that a particular smartphone 415 is locked and requires a password to unlock, etc. In response to determining the service or function requesting credentials, the device may determine the appropriate username and password to transmit to the smartphone 415. In other implementations, the device may transmit a request to the identified smartphone 415 for an identity of the service or function requesting the credentials. For example, the device may determine that the user is looking at the smartphone 415 and transmit a request to the smartphone 415 to provide a URL or other identifier of the displayed website. In response to receiving the URL or other identifier, the device may determine the appropriate username and password to transmit to the smartphone 415.

Further, in response to detecting that the user is looking at the smartphone 415, the device indicator 460 is displayed in a different manner (in FIG. 4D, different line width) to indicate that authentication credentials are being transmitted to the smartphone 415.

In some implementations, the device may further transmit instructions to the smartphone 415 to submit the credentials to the requesting service or function. In other implementations, the user may manually submit the credentials using an input associated with the smartphone 415 (e.g., using a touchscreen of the smartphone 415).

Figure 4F:
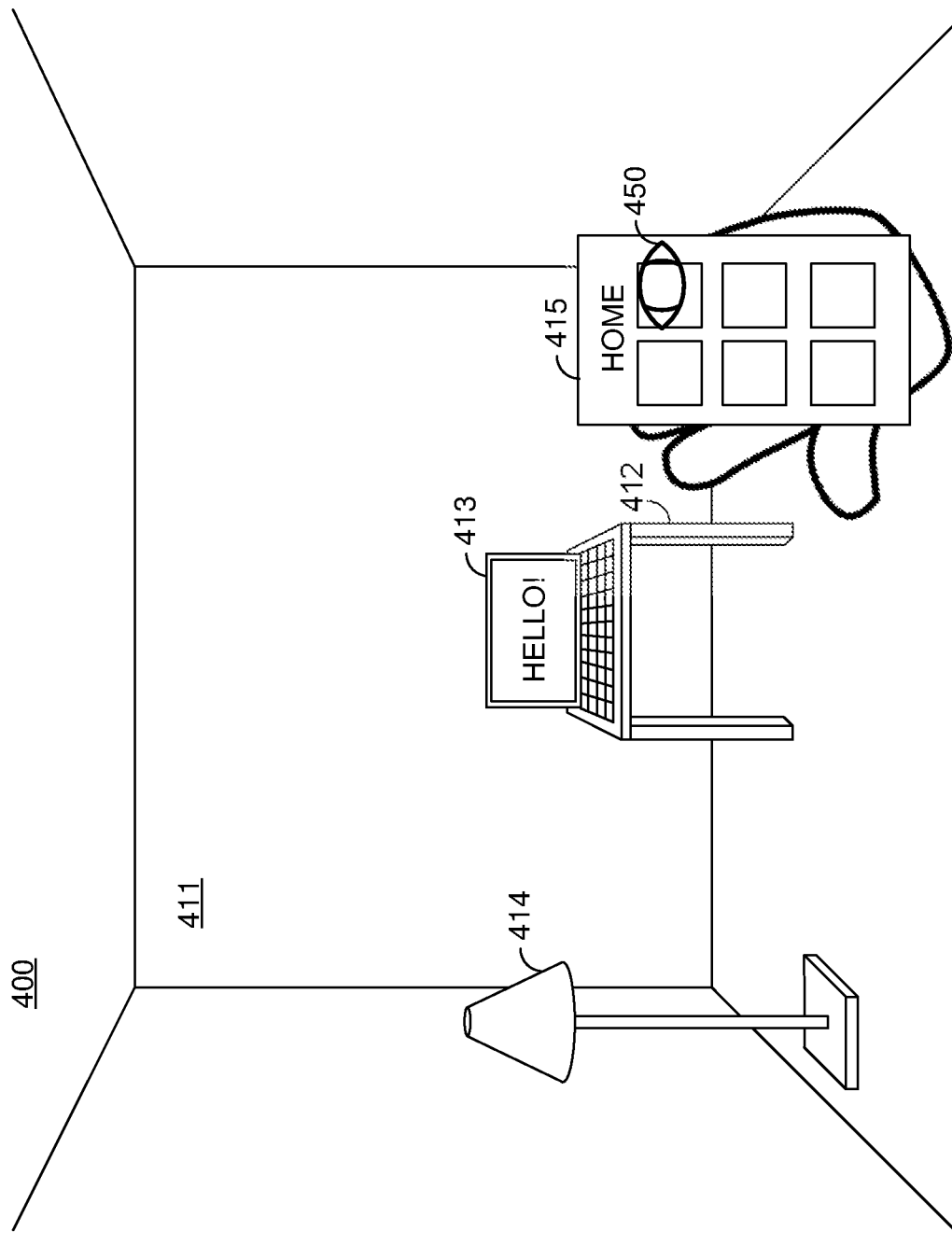

FIG. 4F illustrates the XR environment 400 of FIG. 4A at a sixth time. In FIG. 4F, the gaze direction indicator 450 is displayed over a portion of the smartphone 415 indicating that the user remains looking at the smartphone at the sixth time. Further, in response to receiving the authentication credentials from the device, the smartphone 415 displays a home screen including various icons for launching various applications.

FIG. 5 is a flowchart representation of a method 500 of authenticating a user in accordance with some implementations. In various implementations, the method 500 is performed by a first device with a camera, an eye tracker, one or more processors, and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the first device obtaining, via the camera, an image of a physical environment. In various implementations, the first device is a head-mounted device and the image of the physical environment approximates the field-of-view of the user if the user were not wearing the device. In other implementations, the first device is a handheld electronic device, such as a phone, tablet, or the like. For example, in FIG. 5A, the device captures an image of a physical environment and displays the XR environment 400 based on that image.

The method 500 continues, in block 520, with the first device detecting, in the image of the physical environment, a second device. In various implementations, the first device detects the second device using non-visual means to determine the relative position of the first device and the second device, such as ultra-wideband, microphones, or sonar. In various implementations, the second device is a smartphone, laptop, tablet, smart speaker, or any other electronic device. In various implementations, the first device detects the second device using object detection (e.g., one or more machine learning approaches or deep learning approaches). In various implementations, the first device detects the second device by detecting a display of the second device. However, in various implementations, the first device detects the second device without detecting a display of the second device (e.g., a smart speaker).

In various implementations, detecting the second device includes determining an area of the image (e.g., a set of pixels of the image) corresponding to the second device. In various implementations, in response to detecting the second device, the first device displays a device indicator in association with the second device. For example, in FIG. 4A, the XR environment 400 includes the device indicator 460 surrounding the laptop 413. In various implementations, the first device displays the device indicator in response to detecting the second device configured to accept authentication credentials (e.g., displaying a login screen, displaying a lock screen, or having transmitted a request for authentication credentials).

The method 500 continues, in block 530, with the first device determining, using the eye tracker, a gaze of the user. In various implementations, the eye tracker includes an eye tracking camera that captures an image of at least one eye of the user. In various implementations, determining the gaze of the user includes determining a location in the image of the physical environment corresponding to where the user is looking. In various implementations, the first device displays an indication of the gaze of the user. For example, in FIG. 4A, the XR environment 400 includes the gaze direction indicator 450.

The method 500 continues, in block 540, with the first device determining that the gaze of the user is directed to the second device. In various implementations, determining that the gaze of the user is directed to the second device includes determining that the location in the image corresponding to where the user is looking is within an area of the image corresponding to the second device. In various implementations, in response to determining that the gaze of the user is directed to the second device (e.g., the gaze indicator is within the device indicator), the device indicator is displayed in a different manner. For example, in FIG. 4B, in response to determining that the gaze direction indicator 450 is within the device indicator 460, the device indicator 460 is displayed with a greater line width.

The method 500 continues, in block 550, with the first device transmitting authentication credentials to the second device. In various implementations, the authentication credentials include a passcode. For example, in FIG. 4E, the device transmits a passcode to the smartphone 415. In various implementations, the authentication credentials include a username and password. For example, in FIG. 4B, the device transmits a username and password to the laptop 413. In various implementations, the authentication credentials include a biometric identifier (such as data indicative of an iris pattern, fingerprint, or facial structure).

In various implementations, the method 500 includes the first device receiving, from the second device, a request for the authentication credentials and transmitting the authentication credentials to the second device is performed in response to the request. In various implementations, transmitting the authentication credentials is performed without receiving a request for the authentication credentials from the second device.

In various implementations, the method 500 includes the first device authenticating the user prior to transmitting the authentication credentials to the second device. For example, in various implementations, the first device performs an iris scan of the user, compares the iris scan to stored template, and authenticates the user based on the iris scan matching the template. As another example, in various implementations, the first device receives a passcode or a username and password from the user to authenticate the user.

In various implementations, the first device is a head-mounted device and the first device authenticates the user when the user mounts the head-mounted device on the user's head and the user remains authenticated until the user removes the head-mounted device from the user's head. In various implementations, the first device periodically authenticates the user.

In various implementations, authenticating the user is performed in response to detecting the second device. Accordingly, in various implementations, in response to detecting the second device, the first device authenticates the user (e.g., via an iris scan) and, subsequently, in response to determining that the gaze of the user is directed to the second device, transmits the authentication credentials to the second device.

In various implementations, authenticating the user is performed in response to determining that the gaze of the user is directed to the second device. Accordingly, in various implementations, in response to determining that the gaze of the user is directed to the second device, the first device authenticates the user and, in response to authenticating the user, transmits the authentication credentials to the second device.

In various implementations, the method 500 includes the first device receiving, from the second device, a request for the authentication credentials. In various implementations, authenticating the user is performed in response to receiving the request.

In various implementations, the method 500 includes the first device storing, in the non-transitory memory, a plurality of authentication credentials and selecting the authentication credentials from the plurality of authentication credentials.

For example, in FIGS. 4A-4F, the device stores at least the username and password for the website (which is transmitted to the laptop 413) and the passcode (which is transmitted to the smartphone 415).

In various implementations, selecting the authentication credentials is based on the image of the physical environment. For example, in FIG. 4E, the device detects the smartphone 415 and selects the passcode for the smartphone 415. As another example, in FIG. 5B, the device detects the laptop 413 and transmits the username and password for the website. In various implementations, the device detects the website (in the image of the physical environment) from a plurality of websites for which the device stores authentication credentials.

In various implementations, the method 500 includes the first device receiving, from the second device, a request for the authentication credentials and selecting the authentication credentials is based on the request. For example, in various implementations, the second device transmits an indicator of a website (or application) for which authentication credentials are requested and the first device transmits the authentication credentials associated with that website (or application).

In various implementations, the first device selects the authentication credentials based on computer vision techniques to determine the service or function requesting the credentials. For example, the first device may determine the website and associated account based on text or images on a displayed website, may determine that a particular second device is locked and requires a particular password to unlock, etc. In response to determining the service or function requesting credentials, the first device may select the corresponding authentication credentials. In various implementations, the first device may transmit a request to the second device for an identity of the service or function requesting the credentials. For example, the first device may determine that the user is looking at the second device and transmit a request to the second device to provide a URL or other identifier of the displayed website. In response to receiving the URL or other identifier, the first device may select the authentication credentials.

In various implementations, the authentication credentials provide access to the second device. For example, in FIG. 4F, the authentication credentials unlock the smartphone 415 providing access to the home screen. As another example, in various implementations, the authentication credentials unlock the laptop 413. In various implementations, the authentication credentials provide access to an authentication credential list stored by the second device. For example, in various implementations, the authentication credentials act as a master key for unlocking a plurality of authentication credentials for respective websites, applications, or user accounts.

In various implementations, the second device includes a display that is physically separate from a controller. For example, in various implementations, the second device includes a digital media player coupled to a television set. As noted above, in various implementations, the first device detects the second device by detecting a display of the second device that is visible in the image of the physical environment. Further, in various implementations, the first device determines that the gaze of the user is directed to the second device by determining that the gaze of the user is directed to the display of the second device. In various implementations, the first device transmits the authentication credentials to a controller of the second device that is not visible in the image of the physical environment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a first device including a camera, an eye tracker, one or more processors, and non-transitory memory:
   storing, in the non-transitory memory, a plurality of authentication credentials for a plurality of user accounts;
   obtaining, via the camera, an image of a physical environment;
   detecting, in the image of the physical environment, a second device displaying a password field for receiving a password for a first user account;

selecting, from the plurality of authentication credentials, first authentication credentials including the password for the first user account;

determining, using the eye tracker, a gaze of a user;

determining that the gaze of the user is directed to the second device; and in response to determining that the gaze of the user is directed to the second device, transmitting the first authentication credentials to the second device.

2. The method of claim 1, further comprising receiving, from the second device, a request for the first authentication credentials, wherein transmitting the first authentication credentials to the second device is performed in response to receiving the request.

3. The method of claim 1, wherein transmitting the first authentication credentials to the second device is performed without receiving a request for the first authentication credentials from the second device.

4. The method of claim 1, further comprising authenticating the user prior to transmitting the first authentication credentials to the second device.

5. The method of claim 4, wherein authenticating the user is performed in response to detecting the second device.

6. The method of claim 4, wherein authenticating the user is performed in response to determining that the gaze of the user is directed to the second device.

7. The method of claim 4, further comprising receiving, from the second device, a request for the first authentication credentials, wherein authenticating the user is performed in response to receiving the request.

8. A first device comprising:
a camera;
an eye tracker;
a non-transitory memory; and
one or more processors to:
   store, in the non-transitory memory, a plurality of authentication credentials for a plurality of user accounts;
   obtain, via the camera, an image of a physical environment;
   detect, in the image of the physical environment, a second device displaying a password field for receiving a password for a first user account;
   select, from the plurality of authentication credentials, first authentication credentials including the password for the first user account;
   determine, using the eye tracker, a gaze of a user;
   determine that the gaze of the user is directed to the second device; and
   in response to determining that the gaze of the user is directed to the second device, transmit the first authentication credentials to the second device.

9. The first device of claim 8, wherein the one or more processors authenticate the user prior to transmitting the first authentication credentials to the second device.

10. The first device of claim 9, wherein the one or more processors authenticate the user in response to detecting the second device.

11. The first device of claim 9, wherein the one or more processors authenticate the user in response to determining that the gaze of the user is directed to the second device.

12. A non-transitory computer-readable medium having instructions encoded thereon which, when executed by one or more processors of a first device including a camera and an eye tracker, cause the first device to:
   store, in the non-transitory memory, a plurality of authentication credentials for a plurality of user accounts;
   obtain, via the camera, an image of a physical environment;
   detect, in the image of the physical environment, a second device displaying a password field for receiving a password for a first user account;
   select, from the plurality of authentication credentials, first authentication credentials including the password for the first user account;
   determine, using the eye tracker, a gaze of a user;
   determine that the gaze of the user is directed to the second device; and
   in response to determining that the gaze of the user is directed to the second device, transmit the first authentication credentials to the second device.

13. The method of claim 1, wherein selecting the first authentication credentials is based on detecting the password field in the image of the physical environment.

14. The method of claim 1, wherein selecting the first authentication credentials is based on a request for the first authentication credentials received from the second device.

15. The method of claim 1, wherein transmitting the first authentication credentials is performed in response to determining that the gaze of the user is directed to the password field.

16. The method of claim 1, wherein the second device further displays a username field for receiving a username for the first user account.

17. The method of claim 16, wherein the first authentication credentials further include the username for the first user account.

18. The first device of claim 8, wherein the one or more processors select the first authentication credentials based on detecting the password field in the image of the physical environment.

19. The first device of claim 8, wherein the one or more processors select the first authentication credentials based on a request for the first authentication credentials received from the second device.

20. The first device of claim 8, wherein the one or more processors transmit the first authentication credentials in response to determining that the gaze of the user is directed to the password field.

* * * * *